United States Patent [19]
Vanlautem et al.

[11] 3,879,483
[45] Apr. 22, 1975

[54] PROCESS FOR THE MANUFACTURE OF VINYLCYCLOALKANES

[75] Inventors: Nöel Vanlautem, Brussels, Belgium; Alain Donzel, Orbe, Switzerland

[73] Assignee: Solvay & Cie, Brussels, Belgium

[22] Filed: Mar. 26, 1974

[21] Appl. No.: 454,801

[30] Foreign Application Priority Data
Mar. 26, 1973 France ............................ 10853
Apr. 16, 1973 Switzerland .................... 5843/73

[52] U.S. Cl. ............................................. 260/666 A
[51] Int. Cl. ........................ C07b 17/00; C07c 3/00
[58] Field of Search ................................. 260/666 A

[56] References Cited
UNITED STATES PATENTS

| | | | |
|---|---|---|---|
| 3,381,017 | 4/1968 | Waugh ............................ | 260/666 A |
| 3,408,416 | 10/1968 | Schneider ...................... | 260/666 A |
| 3,641,174 | 2/1972 | Lyons ............................ | 260/666 A |
| 3,706,809 | 12/1972 | Moroe et al. .................. | 260/666 A |
| 3,810,949 | 5/1974 | Shepherd ...................... | 260/666 A |
| 3,819,733 | 6/1974 | Ramsden ....................... | 260/666 A |

OTHER PUBLICATIONS

Louis F. Fieser et al. Organic Chemistry, 1956; Reinhold Publishing Corp., New York, p. 152.

*Primary Examiner*—Veronica O'Keefe
*Attorney, Agent, or Firm*—Spencer & Kaye

[57] ABSTRACT

Vinylcycloalkanes of the formula $R-CH=CH_2$ wherein R is a cycloaliphatic radical with 5 or 6 carbon atoms which can be substituted by substituents selected from the group consisting of alkyl groups containing 1 to 6 carbon atoms and saturated chains containing 1 to 6 carbon atoms and a hetero-atom selected from the group consisting of sulfur, oxygen and nitrogen are prepared by reacting vinyl chloride and an organometallic compound of the formula $(R)_n-M$. The radical R of the organometallic compound is defined as above, M is a lithium atom, a cadmium atom or a magnesium-halogen group and $n$ is equal to 1 when M is lithium or the magnesium-halogen group and is equal to 2 when M is cadmium. A catalyst is used which consists of a metal from Group VIII of the Periodic Table or a compound of a metal from Group VIII of the Periodic Table and at least one compound of an element from Groups VA and VIA of the Periodic Table of elements which is complexed with the metal from Group VIII or the compound of a metal from Group VIII.

14 Claims, No Drawings

PROCESS FOR THE MANUFACTURE OF VINYLCYCLOALKANES

BACKGROUND OF THE INVENTION

The present invention relates to a process for the manufacture of vinylcycloalkanes which can be used as monomers for the manufacture of heat-resistant polymers.

The usual processes for the manufacture of vinylcycloalkanes generally give a mixture of olefins or a mixture of saturated and unsaturated products from which it is often difficult to isolate the desired product. The presence of these impurities in the vinylcycloalkane is very objectionable because it can be a constituent which inhibits their polymerization.

SUMMARY OF THE INVENTION

The process according to the invention makes it possible to overcome this disadvantage. In fact, the yields and the selectivity obtained during the manufacture of vinylcycloalkanes according to the process of the invention are very good. Moreover, the byproducts formed in small amounts can be removed easily.

The process of the present invention for the manufacture of vinylcycloalkanes of the formula $R-CH=CH_2$, wherein R represents a cycloaliphatic radical with 5 or 6 carbon atoms which can be substituted by substituents selected from the group consisting of alkyl groups containing 1 to 6 carbon atoms and saturated chains containing 1 to 6 carbon atoms and a heteroatom selected from the group consisting of sulfur, oxygen and nitrogen, comprises reacting vinyl chloride with an organometallic compound $(R)_n$-M, wherein R is defined as above, M represents a lithium atom, a cadmium atom or a magnesium-halogen group and n is equal to 1 when M represents lithium or the magnesium-halogen group and is equal to 2 when M represents cadmium, in the presence of a catalyst consisting of a metal from Group VIII of the Periodic Table or a compound of a metal from Group VIII of the Periodic Table and at least one compound of an element selected from the group consisting of Group VA and Group VIA of the Periodic Table of the Elements which is complexed with the metal or the compound of a metal of Group VIII.

GENERAL ASPECTS OF THE INVENTION

The process of the present invention is especially applicable to the preparation of substituted or unsubstituted vinylcyclohexanes and vinylcyclopentanes. It is very particularly suitable for the manufacture of vinylcyclohexane.

The metal from Group VIII which is present in the catalyst can be especially iron, nickel, cobalt or palladium. Iron and nickel have proved to be particularly valuable. These metals can be used as such or in the form of organometallic compounds or metal salts. Among the metal salts, metal halides are very suitable for carrying out the process according to the invention. Iron chlorides and nickel chloride have proved advantageous. Organonickel compounds may be used especially as organometallic compounds in preparing the catalysts.

The agent which coplexes the metal from Group VIII or the compound of a metal from Group VIII can be an organic or inorganic compound of an element from Groups VA and VIA. Thus it is possible especially to use organic compounds of oxygen such as especially diethyl ether, tetrahydrofuran and dioxanes, organic compounds of nitrogen such as amines, aromatic-aza compounds and the like, organic compounds of sulfur such as thioethers and the like, and organic compounds of phosphorus, antimony and arsenic such as alkyl-, aryl-, alkenyl- and cycloalkyl- phosphines, -stibine or -arsines and the like.

Ferric chloride complexed by tetrahydrofuran and nickel (II) chloride complexed by 1,2,-bis-(diphenylphosphino)-ethane are very particularly suitable as catalysts.

The starting organometallic compound $(R)_n$-M which is reacted with vinyl chloride is preferably the cycloalkyl-magnesium halide corresponding to the vinylcycloalkane which it is desired to manufacture. The chloride or the bromide preferably is chosen as the halide. Vinylcyclohexane can thus be produced by reacting vinyl chloride with a cyclohexyl-magnesium halide.

The starting organometallic compound $(R)_n$-M can be produced in accordance with known processes. The cycloalkylmagnesium halide can thus be manufactured by reacting magnesium with the corresponding cycloalkyl halide in a solvent suitable for Grignard reactions. The cycloalkyl-lithium compound can itself be prepared by reacting the corresponding cycloalkyl chloride with lithium in a solvent suitable for Grignard reactions, such as, for example, aliphatic or cyclic ethers such as diethyl ether, dioxane and tetrahydrofuran. Likewise, the dicycloalkyl-cadmium compound can be prepared, for example, by reacting the corresponding cycloalkyl-magnesium halide with cadmium chloride. Other processes for preparing the said organometallic compounds $(R)_n$-M can also be suitable.

The reaction between the vinyl chloride and starting organometallic compound $(R)_n$-M is carried out in the liquid phase. In general, a solvent is used in which the starting organometallic compound $(R)_n$-M is either completely or partially soluble. It is thus possible, for example, to use cyclic or aliphatic ethers such as ether, tetrahydrofuran and dioxane, hydrocarbons, amines and thioethers or various mixtures of these compounds as the reaction solvent.

A particularly simple process for carrying out the invention consists of manufacturing the starting organometallic compound $(R)_n$-M and then of reacting the latter in situ with vinyl chloride in the presence of the catalyst according to the process of the invention. If the organic compound of an element from Groups VA and VIA used as the agent for complexing the metal or the compound of a metal from Group VIII is a product which is suitable as a solvent for Grignard reactions, it can advantageously be used as the main constituent of the reaction medium. Thus, for example, when the agent for complexing the metal or the compound or a metal from Group VIII is an aliphatic or cyclic ether, this ether can advantageously be used as the solvent for the reaction. In the case of the use of ferric chloride complexed by tetrahydrofuran, tetrahydrofuran will preferably be used as the solvent.

The reaction can be carried out at temperatures between ambient temperature and the boiling point of the reaction mixture at the reaction pressure. It is sometimes particularly advantageous to work under reflux because it is thus possible easily to remove the heat generated in the reaction. The reaction can, however, also be carried out at temperatures below ambient temperature. The reaction pressure can be equal to, below or above atmospheric pressure.

The reactor can function continuously or discontinuously. When the reaction is carried out discontinuously, it can be valuable to add the catalyst as the reaction progresses so as to ensure that the reaction takes place at a suitable rate.

DESCRIPTION OF THE PREFERRED EMBODIMENTS

The following examples illustrate the process according to the invention without, however, limiting it.

EXAMPLE 1

The following constituents are introduced successively into a 1,250 l enamelled reactor:
41 kg of Mg turnings,
100 liters of tetrahydrofuran (THF) and
300 ml of cyclohexyl chloride.

After starting the reaction with iodine crystals, the reaction mixture is maintained under reflux by adding a mixture of equal volumes of THF and cyclohexyl chloride. The time taken to introduce 400 liters of this mixture is 3.5 hours. The reactor is cooled by having water at about 15°C flowing through a double jacket.

100 liters of THF are added to the mixture obtained and gaseous vinyl chloride is then introduced into the reactor, via a drip tube, for 3.5 hours, at the rate of 25 to about 30 kg/hour The reaction mixture, cooled by having water at about 15°C flowing through the double jacket, is kept under reflux by adding a 0.1 molar solution of $FeCl_3$ in THF as catalyst solution. At the end of about 3.5 hours, about 110 kg of vinyl chloride and 80 liters of catalyst solution have thus been introduced. 100 liters of THF are then evaporated. In order to dissolve the $MgCl_2$ formed, water is added to the reaction mixture.

After removing the aqueous phase, the organic phase is distilled.

Vinylcyclohexane is obtained in a yield of 77.7 percent.

EXAMPLE 2

19 parts of gaseous vinyl chloride and 1 part of a 0.1 M solution of ferric chloride in tetrahydrofuran as catalyst solution are introduced, in the following way, into a solution of cyclohexylmagnesium chloride produced from 25 parts of chlorocyclohexane and 5 parts of magnesium in 50 parts of tetrahydrofuran:

The gaseous vinyl chloride is introduced via a feed tube immersed in the liquid solution of cyclohexylmagnesium chloride and tetrahydrofuran. The introduction of vinyl chloride is started, while introducing simultaneously a small amount of the catalyst solution.

The temperature of the reaction mixture rises rapidly and becomes stable at the boiling point of the mixture, that is to say about 64°C at the start of the reaction and about 76°C towards the end. The rate at which vinyl chloride is introduced is adjusted so as to achieve vigorous refluxing. As soon as either a decrease in the refluxing or a drop in the temperature or incomplete absorption of vinyl chloride is observed, a new portion of catalyst is introduced until such an introduction no longer starts up the reaction again.

At this stage, the tetrahydrofuran is distilled, the residue is taken up with dilute sulfuric acid and, after separating the phases, 17 parts of vinylcyclohexane are distilled, the composition of which is as follows:

| | |
|---|---|
| vinylcyclohexane | 99.4% |
| ethylcyclohexane | <0.1% |
| vinylidene cyclohexane | <0.1% |
| cyclohexanone | <0.1% |
| chlorocyclohexane | <0.1% |
| 1-vinyl-1-cyclohexene | <0.1% |
| unidentified impurities | <0.3% |

EXAMPLE 3

2.0 g of dichloro-(1,2-bis-[diphenylphosphino]-ethane)-nickel (II) are added as catalyst, all at once, to 28.6 g of cyclohexylmagnesium chloride dissolved in 100 ml of ethyl ether and 15 ml of n-decane, both solvents being dry and deoxygenated; thereafter, approximately 12.5 g of vinyl chloride in the gaseous state are added over the course of 35 minutes. During the experiment, the temperature of the mixture is kept between 0°C and 8°C. Vinylcyclohexane is obtained in a yield of 78 percent.

The cyclohexylmagnesium chloride was manufactured by reacting 23.7 g of chlorocyclohexane dissolved in ether with 4.9 g of magnesium turnings.

EXAMPLE 4

0.05 g of dichloro-(1,2-bis-[diphenylphosphino]-ethane)nickel (II) is added as catalyst, all at once, to 28.6 g of cyclohexylmagnesium chloride, prepared as in Example 3, dissolved in 100 ml of ethyl ether and 20 ml of n-decane, both solvents being dry and deoxygenated; thereafter, approximately 15.6 g of vinyl chloride in the gaseous state are added over the course of 2.75 hours. During the experiment, the temperature of the mixture is kept at 25°C. Vinylcyclohexane is obtained in a yield of 76.2 percent.

Comparison of Examples 3 and 4 shows that even at very low concentrations the catalyst according to the invention is still active.

Other inorganic compounds of a metal of group VIII of the Periodic Table such as nitrates, sulfates, phosphates or oxides can also be used in the catalyst.

The process of the invention is similarly applicable to the preparation of (alkyl)vinylcycloalkanes or vinylcycloalkanes substituted by saturated chains containing in the chain simultaneously 1 to 6 carbon atoms and a hetero-atom.

The amount of catalyst used in the process can vary from 0.01 to 20 and preferably from 0.1 to 10 molar percent of the organometallic compound. The amount of the vinyl chloride used in the process is of from about 0.5 to 2 mole per mole of the organometallic compound. Temperature from 10° to 200° C and preferably from 20° to 150° C and absolute pressure from 0.2 to 20 atmospheres to 0.5 to 10 atmospheres can be used.

It will be understood that the above description of the present invention is susceptible to various modifications, changes and adaptations and the same are intended to be comprehended within the meaning and range of equivalents of the appended claims.

We claim:

1. A process for the manufacture of vinylcycloalkanes of the formula $R-CH=CH_2$, wherein R represents a cycloaliphatic radical with 5 or 6 carbon atoms which can be substituted by substituents selected from the group consisting of alkyl groups containing 1 to 6 carbon atoms and saturated chains containing 1 to 6 carbon atoms and a hetero-atom selected from the group consisting of sulfur, oxygen and nitrogen, the process comprising reacting vinyl chloride with an organometallic compound $(R)_n$-M, wherein R is defined as above, M represents a lithium atom, a cadmium atom or a magnesium-halogen group, and n is equal to 1 when M represents lithium or the magnesium-halogen group and equal to 2 when M represents cadmium, in the presence of a catalyst consisting of a metal from Group VIII of the Periodic Table or a compound of a metal from Group VIII of the Periodic Table and at least one compound of an element selected from the group consisting of Group VA and Group VIA of the Periodic Table of the Elements which is complexed with the metal or the compound of a metal from Group VIII.

2. The process according to claim 1 wherein R is a cyclohexyl radical.

3. The process according to claim 1 wherein a compound of a metal from Group VIII is used in the catalyst and said compound of a metal from Group VIII is a metal salt.

4. The process according to claim 3 wherein the metal salt is a metal chloride.

5. The process according to claim 4 wherein the metal chloride is nickel chloride.

6. The process according to claim 4 wherein the metal chloride is ferric chloride.

7. The process according to claim 1 wherein an organic compound of an element from Groups VA and VIA is used.

8. The process according to claim 7 wherein the organic compound of an element from Groups VA and VIA is an organic compound of phosphorus.

9. The process according to claim 8 wherein the organic compound of phosphorus is 1,2 -bis- (diphenylphosphino) -ethane.

10. The process according to claim 7 wherein the organic compound of an element from Groups VA and VIA is an organic compound of oxygen.

11. The process according to claim 10 wherein the organic compound of oxygen is tetrahydrofuran.

12. The process according to claim 1 wherein the organometallic compound $(R)_n$-M is a halogenated compound of magnesium.

13. The process according to claim 12 wherein the organometallic compound $(R)_n$-M is a cyclohexylmagnesium halide.

14. The process according to claim 13 wherein the cyclohexylmagnesium halide is prepared in situ by reacting a cyclohexyl halide with magnesium, and cyclohexylmagnesium halide is reacted in situ with vinyl chloride.

* * * * *